E. M. LIED.
DUMP CAR.
APPLICATION FILED MAY 12, 1908.

907,254.

Patented Dec. 22, 1908.

WITNESSES:
A. Qager
Ray Brenholt

Ernst M. Lied,
INVENTOR

BY
Geo. W. Rightmire
ATTORNEY

UNITED STATES PATENT OFFICE.

ERNST MITCHELL LIED, OF COLUMBUS, OHIO, ASSIGNOR TO THE KILBOURNE AND JACOBS MANUFACTURING COMPANY, OF COLUMBUS, OHIO, A CORPORATION OF OHIO.

DUMP-CAR.

No. 907,254.   Specification of Letters Patent.   Patented Dec. 22, 1908.

Application filed May 12, 1908. Serial No. 432,487.

*To all whom it may concern:*

Be it known that I, ERNST MITCHELL LIED, a citizen of the United States, residing at Columbus, in the county of Franklin and State of Ohio, have invented certain new and useful Improvements in Dump-Cars, of which the following is a specification.

My invention relates to improvements in dump cars, especially of the style of car that is pivoted on the truck and adapted to be operated from one end thereof, and swung upon its pivot to dump towards its opposite end; preferably at the opposite end there is provided a pivoted door which is suspended from the top of the car and swings outwardly away from the car whenever the dumping operation takes place, whereby the lading may be discharged from the end. The door of the car, for quick operation, should be arranged to be locked and unlocked automatically, and my improvement relates to an automatic locking and releasing construction for the door of a car of the general type above mentioned.

The manner of carrying out my invention will be hereinafter fully described, but it will be stated here that the idea is to provide a door to be unlocked automatically by tilting the car from its normal position, and to be automatically locked by returning the car to its normal position.

Figure 1:
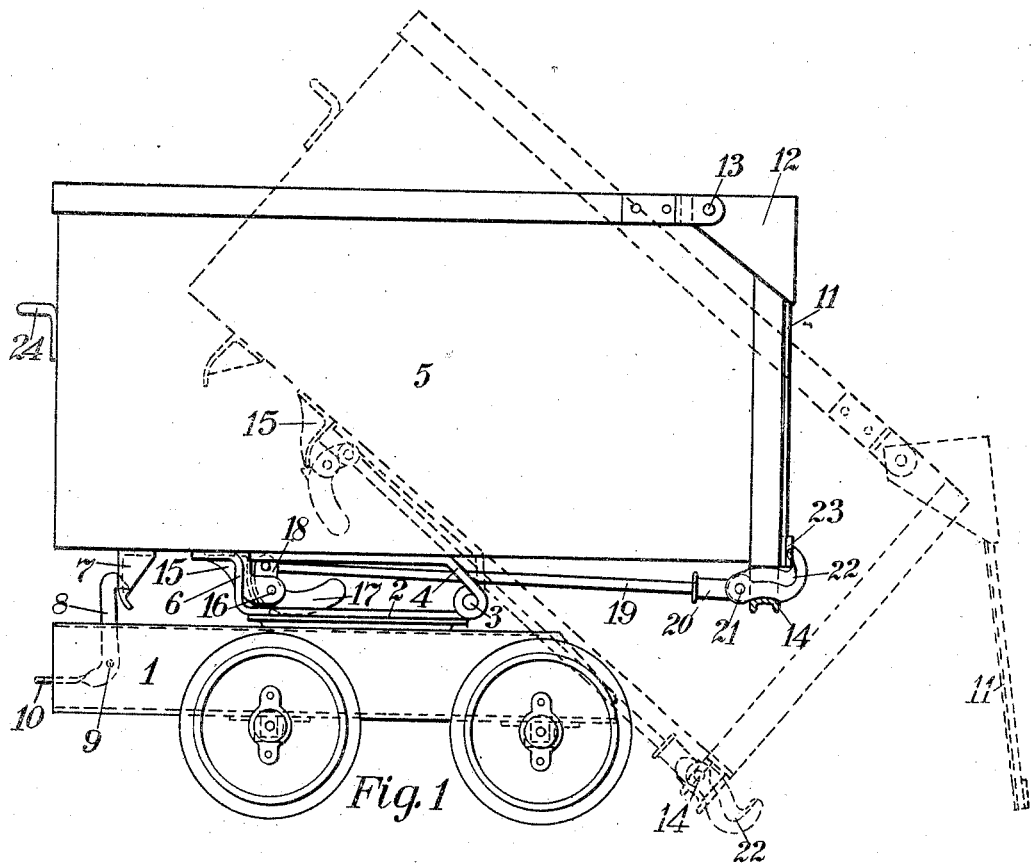
Figure 2:
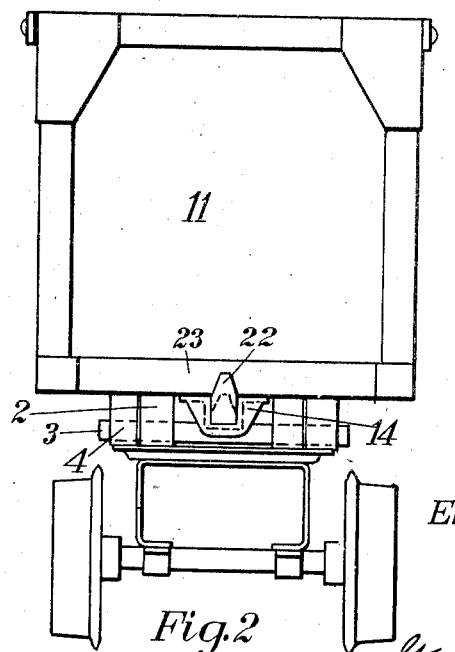

In the drawings which are hereto attached and hereby made a part of this specification, Figure 1 is a side view of a car having my improvements thereon shown in normal position, and also in dumped position in the dotted lines; Fig. 2 is an end view showing the door construction and the lock therefor in normal position.

Referring to the drawings in which the same numeral indicates the same part throughout, 1 is the truck of a dump car, provided with the turn table 2 appropriately mounted thereon; the hinge pin 3 completes the hinge construction formed by the member 4 secured to the under side of the car box 5 having the hook at its end, and the bracket or bearing member 6 arising from the turn-table at one end and secured thereto, and having its other end formed with a hook, the hooks thus provided on members 4 and 6 registering for the reception of the pin 3. The connection between the car box 5 and the truck therefor is formed by means of this hinge construction just described. The car adjacent its front end is provided with the notched member 7 which is adapted to be engaged by the hook lever 8 to latch the car box in its normal position; this hook lever 8 is pivoted upon the truck at 9, and is so arranged as to be preferably controlled by the foot of the operator pressing upon the extension 10, to unlock the same whereby the car box is released and may be dumped. The car door 11 is provided at its upper ends with the gusset plates 12 which extend along the side of the car, and receive the pivot bolts 13 at some distance from the end of the car; pivoting the door in this manner gives it greater clearance from the track upon which the car moves, when the door is swung open, and thereby obviates the difficulty experienced in this type of car where the door is pivoted at the end thereof. The door is adapted to be engaged at its lower end by a locking construction which is automatically locked and released through the dumping operation of the car and which will now be described.

Near the end of the bottom of the car is provided a yoke or bracket member 14, which may be secured to the car in any desired manner; a second bracket member 15 is secured to the bottom of the car above the turn table 2, and in this bracket member 15 is pivotally mounted at 16 the cam lever 17 adapted when the car is in normal position to lie against the upper face of the turn table 2, and when the car box is swung upwardly on its hinge 3, the weight of the door 11 acting against the hook 22 hereinafter described causes the cam lever 17 to swing on its pivot 16 thereby throwing its upper end 18 towards the right or rear end of the car. When the car box is again lowered, the lower end of the cam lever engages the upper face of the turntable 2 and is thereby swung on the pivot 16 to withdraw or retract the upper end 18. Pivotally connected with the upper end 18 of the cam lever 17 is the bar 19, extending longitudinally beneath the car to a point adjacent its front end where it is provided with a headed portion 20 which is pivotally connected at 21 with the hook 22, which is positioned in the yoke member 14 to have considerable freedom of movement therein, both longitudinally and vertically. The hook member 22 is adapted when the car is in its normal position to engage the lower end of the door 11, and thus lock the door securely. The position of the parts of the locking device when the car is in its normal position is shown in Fig. 1, in heavy lines, while the position of the parts when the car is dumped and the door is consequently unlocked and opened is shown in dotted lines in Fig. 1.

The operation of the parts to pass from their normal position to their unlocked position is as follows, to wit: When the operator has released the latch 8 he lifts upwardly on the handle 24, thereby relieving the cam lever from its engagement with the upper face of the turntable 2, whereupon it is free to swing on its pivot 16; the cam lever is actuated to swing on its pivot by the pressure of the door and the lading crowding thereagainst on the hook 22, whereby the hook will be forced outwardly away from the car, thereby swinging the cam lever on its pivot. When the lading pressing against the door has caused the same to force the hook to an unlocking position, the hook will of its own weight swing downwardly upon its pivot 21, thereby passing out of the way of the swinging door 11, this movement being timed to take place at the proper moment for the swinging open of the door and the discharge of the lading.

It will be noted that the yoke member 14 is curved so that its outer side is slightly lower than its inner side, which formation facilitates the drop of the hook when it is released from contact with the door. The position of the hook when the door is open is shown in dotted lines in Fig. 1.

When the car box is being restored to its normal position, the door 11 will swing towards its closed position, and the cam lever 17 will engage the turntable, thereby withdrawing the hook 22; the movement of the door and the retraction of the hook 22 are so timed that the door will pass above the hook and just as it has reached its closed position, the hook will be tilted upwardly by the curved lower face of the yoke 14, and thereby will engage the door construction at 23. It is therefore seen that the lifting of the car box disengages the cam lever from the truck, and the pressure of the weight of the door of an empty car or of the lading of a loaded car against the door will force the hook 22 outwardly and when it has reached the proper point it will of its own weight fall away from the door, due to the shape of the yoke, thereby permitting the lading to swing the door open; this movement of the parts all takes place automatically consequent upon the lifting of the car box by the handle 24 on its pivot 3. When the car box is returned to its normal position, the engagement of the cam lever 17 with the truck automatically retracts the hook 22 to a proper locking position, while the door 11, through gravity is swinging to its closed position. It is therefore seen that the operation of the locking and releasing devices herein described is automatic.

I do not confine myself to the specific construction shown and described, but desire to claim all modifications which are within the spirit of my invention.

What I claim is:

1. In a dump car pivoted upon a truck and having a swinging door, a cam lever pivoted to said car and adapted to be out of contact with said truck when said car is dumped, a hook for said door, a bar connecting said hook and said lever, said lever being adapted to be brought into contact with said truck when the car is righted, whereby said lever is swung upon its pivot to retract said bar and actuate said hook to lock the door.

2. In a dump car hinged upon its truck and having a pivoted door, an automatic locking and releasing construction for said door comprising a yoke member depending from said car box, a hook member for locking said door positioned in said yoke member and free to move longitudinally and vertically, and automatic means for actuating said hook member outwardly and downwardly from said door to unlock the same when said car is dumped, and automatic means retracting said hook into locking engagement with said door when said car box is restored to its normal position.

3. In a dump car hinged upon its truck and having a pivoted door, an automatic releasing construction for said door comprising a lever pivotally mounted upon said car box and adapted to be actuated in one direction by gravity when free to move, and in the opposite direction by engagement with the truck, a bar pivotally connected with said lever, a hook member pivotally connected with said bar member and adapted to engage said door to lock the same, said hook member being adapted to be actuated by the pressure of said door thereagainst when the car box is tilted to move said bar longitudinally whereby said lever is swung on its pivot, and suspending means for said hook member permitting said hook member to have both a longitudinal and a vertical movement therein.

4. In a dump car comprising a car box hinged to swing vertically upon its truck, a door pivotally mounted upon said car box, a bracket depending from the bottom of said car box, a cam lever pivotally mounted in said bracket and adapted through gravity to swing in one direction, and by contact with the truck to be swung in the opposite direction, a bar pivotally connected with said lever and hinged beneath said car box for longitudinal reciprocation, a hook member pivotally connected with said bar and adapted to be retracted longitudinally thereby, a yoke mounted upon said car box and adapted to receive said hook member, whereby said hook member is permitted to fall away from engagement with the said door when it has been moved to its outermost position, and whereby said hook member is adapted to be raised to its normal locking position when said hook member has been retracted by the longitudinal movement of said bar.

In testimony whereof I affix my signature in the presence of two witnesses.

ERNST MITCHELL LIED.

Witnesses:
 CHAS. H. DOTY;
 JAS. W. FERGUSON.